United States Patent
Ouzounov

(10) Patent No.: US 10,623,114 B2
(45) Date of Patent: Apr. 14, 2020

(54) METHOD AND APPARATUS FOR FULL DUPLEX BODY-COUPLED COMMUNICATION

(71) Applicant: KONINKLIJKE PHILIPS N.V., Eindhoven (NL)

(72) Inventor: Sotir Filipov Ouzounov, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/300,076

(22) PCT Filed: May 10, 2017

(86) PCT No.: PCT/EP2017/061171
§ 371 (c)(1),
(2) Date: Nov. 9, 2018

(87) PCT Pub. No.: WO2017/194601
PCT Pub. Date: Nov. 16, 2017

(65) Prior Publication Data
US 2019/0158191 A1    May 23, 2019

(30) Foreign Application Priority Data

May 11, 2016    (EP) .................................... 16169153

(51) Int. Cl.
*H04B 5/00*    (2006.01)
*H04B 13/00*    (2006.01)
(Continued)

(52) U.S. Cl.
CPC .......... *H04B 13/005* (2013.01); *H04J 3/0638* (2013.01); *H04L 5/16* (2013.01); *H04W 56/001* (2013.01); *H04W 56/004* (2013.01)

(58) Field of Classification Search
CPC . H04B 13/005; H04W 56/001; H04W 56/004
(Continued)

(56) References Cited

U.S. PATENT DOCUMENTS 5,649,296 A * 7/1997 MacLellan ........... G06K 7/0008
340/7.1
5,864,592 A * 1/1999 Itri ........................ H04J 3/0676
375/220
(Continued)

FOREIGN PATENT DOCUMENTS

EP          2069820 B1    11/2011
WO        WO8904093 A1    5/1989
(Continued)

OTHER PUBLICATIONS

Otto C et al., "System Architecture of a Wireless Body Area Sensor Network for Ubiquitous Health Monitoring", Journal of Mobile Multimedia, Rinton Press, Inc, Paramus, NJ, USA, vol. 1, No. 4, Jan. 15, 2006, (Jan. 15, 2006), pp. 307-326,XP002629701.
(Continued)

*Primary Examiner* — April G Gonzales

(57) ABSTRACT

A communication apparatus comprising a receiver and a transmitter for receiving/transmitting signals in the range of 100 kHz to 100 MHz. A controller is configured to cause a clock signal used by one of the receiver and the transmitter part with to be offset with respect to a clock signal used by the other of the receiver and the transmitter. A switch arrangement is provided between an input and output, and the receiver and the transmitter. The switch arrangement is configured to switch between the receiver and the transmitter during a clock cycle such that, in use, part of a clock cycle is available for signal transmission and part of the clock cycle is available for signal reception.

17 Claims, 7 Drawing Sheets

(51) Int. Cl.
*H04J 3/06* (2006.01)
*H04L 5/16* (2006.01)
*H04W 56/00* (2009.01)

(58) Field of Classification Search
USPC ....................................................... 455/41.1
See application file for complete search history.

(56) References Cited

U.S. PATENT DOCUMENTS

| | | | | |
|---|---|---|---|---|
| 6,266,799 | B1* | 7/2001 | Lee ...................... | H03L 7/0814 716/113 |
| 6,424,820 | B1* | 7/2002 | Burdick ............... | H04B 5/0081 455/132 |
| 6,754,472 | B1* | 6/2004 | Williams .................. | H04Q 9/04 455/100 |
| 7,742,816 | B2* | 6/2010 | Masoud ................ | A61B 5/0024 607/32 |
| 8,165,522 | B2* | 4/2012 | Park ..................... | H04B 13/005 340/5.8 |
| 8,467,726 | B2* | 6/2013 | Shirakata .............. | A61B 5/0002 455/41.2 |
| 8,594,568 | B2* | 11/2013 | Falck ................... | H04B 13/005 340/10.33 |
| 8,771,184 | B2* | 7/2014 | Besson ............... | A61B 5/14552 455/115.3 |
| 8,818,300 | B2* | 8/2014 | Falck ................... | A61B 5/0028 455/100 |
| 9,002,298 | B2* | 4/2015 | Karlsson ................ | H04M 1/05 455/100 |
| 9,662,679 | B2* | 5/2017 | Chen ..................... | B06B 1/0292 |
| 2004/0202339 | A1* | 10/2004 | O'Brien, Jr. ......... | H04B 13/005 381/312 |
| 2007/0190952 | A1* | 8/2007 | Waheed ............... | H04B 1/0475 455/114.3 |
| 2008/0261523 | A1* | 10/2008 | Kubono ............... | H04B 13/005 455/41.1 |
| 2010/0240303 | A1* | 9/2010 | Charrat ................... | H04B 5/00 455/41.1 |
| 2011/0200150 | A1* | 8/2011 | Fazzi ................... | H04B 13/005 375/343 |
| 2012/0299540 | A1* | 11/2012 | Perry ...................... | H02J 5/005 320/108 |
| 2013/0078919 | A1* | 3/2013 | Kubono ............... | H04B 13/005 455/41.1 |
| 2013/0197920 | A1* | 8/2013 | Lesso .................. | H04L 25/4902 704/500 |
| 2014/0106673 | A1* | 4/2014 | Son ...................... | A61B 5/0024 455/41.1 |
| 2015/0093988 | A1* | 4/2015 | Konanur ............... | H04B 5/0031 455/41.1 |
| 2015/0249482 | A1* | 9/2015 | Czaja .................. | H04B 5/0031 455/41.1 |
| 2015/0303980 | A1* | 10/2015 | Beals .................. | H04N 21/4131 348/734 |
| 2015/0312704 | A1* | 10/2015 | Tarnhed ................ | H04W 84/10 455/41.1 |
| 2015/0365782 | A1* | 12/2015 | Batra ...................... | H04L 27/18 455/41.1 |
| 2016/0057565 | A1* | 2/2016 | Gold ...................... | H04L 67/12 455/41.1 |
| 2016/0191120 | A1* | 6/2016 | Dobyns ................ | H04B 5/0075 455/41.1 |
| 2016/0374703 | A1* | 12/2016 | Yu ...................... | A61B 17/2202 606/128 |
| 2017/0246661 | A1* | 8/2017 | Chen ..................... | B06B 1/0292 |

FOREIGN PATENT DOCUMENTS

| | | |
|---|---|---|
| WO | WO9966648 A1 | 12/1999 |
| WO | WO2010049842 A1 | 5/2010 |
| WO | WO2014177412 A1 | 11/2014 |

OTHER PUBLICATIONS

Min Chen et al., "Body Area Networks: A Survey", Mobile Networks and Applications, ACM, New York, NY, US, vol. 16, No. 2, Apr. 1, 2011 (Apr. 1, 2011), pp. 171-193, XP058000213.

Sabharwal, A. et al., "In-Band Full-Duplex Wireless: Challenges and Opportunities", Selected Areas in Communications, IEEE Journal, May 20, 2014, vol. 32, Issue: 9.

Debaillie, B. et al., "Analog/RF Solutions Enabling Compact Full-Duplex Radio", IEEE Journal on Selected Area in Communications, vol. 32 Issue: 9, pp. 1662-1673, Sep. 2014.

* cited by examiner

METHOD AND APPARATUS FOR FULL DUPLEX BODY-COUPLED COMMUNICATION

FIELD OF THE INVENTION

Some embodiments relate to a communication apparatus and method and in particular but not exclusively to a communication apparatus and method supporting body coupled communications.

BACKGROUND OF THE INVENTION

Body-coupled communications (BCC) or body-based communication has been proposed as a basis for body area networks (BANs) as standardized by the 802.15.6 Task Group of the Institute of Electrical and Electronics Engineers (IEEE). BCC allows exchange of information between a plurality of devices which are at or in close proximity of a body of a human or an animal. This can be achieved by capacitive or galvanic coupling of low-energy electric fields onto the body surface.

In body-coupled communication (BCC) systems information is transmitted from a transmission device to a receiver device via signals across the user's body. Body-coupled communication may utilize an electric field to transmit information. Body-coupled communication (BCC) uses the human body as communication channel. It enables wireless communication over a human body between devices that are in contact with that human body. Signals are conveyed over the body instead of through the air. As such, the communication is confined to an area close to the body. Therefore, communication is possible between devices situated on, connected to, or placed close to the body.

In body-coupled communication (BCC) the signals are transmitted via couplers, which are placed near or on the body. These couplers transfer the data signal, for example galvanically or capacitively, to the body. The transfer characteristic of the body channel is shown to be good for frequencies from about 100 kHz up to about 100 MHz. The noise is highest at low frequency and declines with 1st to 3rd order roll-off depending on the environment. Lower frequencies may thus be more affected by electrostatic interference in the body channel. At frequencies above 100 MHz the wavelength, i.e. <3 m, comes in the range of the length of (parts of) the human body, and the human body starts to act as an antenna; as a consequence, it is possible that the BCC nodes located on different bodies can communicate which each other using the "human body antenna". For even higher frequencies, even the couplers start acting as antennas. Hence, communications could also take place when the (human) body is not present as communication medium. Both effects are unwanted, since only devices placed on or near the same (human) body are supposed to communicate.

It has been proposed to use a half-duplex methodology where there are alternating transmit and receive cycles. This is so the transmission does not affect the receiver performance.

In some applications, it may be desirable to have a device which is able to transmit and receive during a same clock cycle.

SUMMARY

According to an aspect, there is provided a communication apparatus comprising: an input configured to receive signal in the range of 100 kHz to 100 MHz; a receive part configured to receive the signal from said input; an output configured to output a signal in the range of 100 kHz to 100 MHz; a transmit part configured to provide said signal to said output; a controller configured to cause a clock signal used by one of the receive part and the transmit part with to be offset with respect to a clock signal used by the other of the receive part and the transmit part; and a switch arrangement provided between: said input and output; and said receive part and said transmit part, wherein said switch arrangement is configured to switch between the receive part and the transmit part during a clock cycle such that, in use, part of the clock cycle is available for signal transmission and part of the clock cycle is available for signal reception.

Some embodiments may have the advantage a channel bandwidth can be fully utilized as compared to a half-duplex operation.

Some embodiments may avoid direct coupling of the transmitted signal to the receiving part during transmitting. This may provide good isolation.

Some embodiments may be relatively simple to implement with efficient use of hardware resources The input may be configured to receive a body coupled signal and said output may be configured to output a body coupled signal, said input and output may be configured to be coupled to one or more common body coupled communication electrodes. In some embodiments the same electrodes may be used for reception and transmission.

The switch arrangement may comprises at least one transistor.

In some embodiments, this may allow the apparatus may be at least partly implemented by integrated circuitry. Alternatively or additionally rapid switching may be achieved.

The switch arrangement may comprise a plurality of transistor arrangements, at least one transistor arrangement being provided between said input and said receive part and at least one transistor arrangement being provided between said transmit part and said output.

At least one transistor arrangement provided between said input and said receive part may comprise a transistor of a first conductivity type and at least one transistor arrangement provided between the transmit part and said output may comprise a transistor of a second, different conductivity type.

This may reduce or avoid any signal coupling between the transmitter part and the receiver part.

At least one transistor arrangement may comprise a complementary MOS pair of transistors.

This may minimise effects such as charge injection and asymmetric duty cycle.

The transmit part may be configured such that signals to be transmitted to different devices are transmitted in different time slots.

This allows the communication device to be in communication with a plurality of different devices.

The controller may be configured such that the clock signal used by one of the receive part and the transmit part has a plurality of different offsets with respect to the clock signal used by the other of the receive part and the transmit part such that in use a respective plurality of signals is one of transmitted and received in a clock cycle.

This may allow the same apparatus to communicate with a plurality of different devices which out delay.

The controller may be configured to control said apparatus, such that in use, said apparatus has a first initial mode and a second mode, wherein in said first initial mode said apparatus operates in a half-duplex mode and in said second mode, said apparatus operates in a full duplex mode.

The half-duplex may be used to synchronise between devices before a full duplex mode is used.

The controller may be configured in said first mode of operation to determine a time offset for said clock signal.

This may ensure that an appropriate offset between the receive and transmit signals is easily determined.

The communication apparatus may comprise a local oscillator configured to provide clock signals used by said transmit part and said receive part.

A single oscillator may be used as compared to the half-duplex arrangements which use two.

The signal to be transmitted and said received signal may be encoded with a transition based scheme.

This may make the signal less susceptible to background noise.

The controller may be configured to provide at least one control signal to control said switch arrangement, said at least one control signal having a speed of said clock signal.

This may assist in providing a quick transition between receiving and transmitting of signals.

A body coupled communication device may comprise the above described apparatus.

According to another aspect, there is provided a communication apparatus comprising: an input configured to receive a body coupled signal; a receive part configured to receive the body coupled signal from said input; an output configured to output a body coupled signal; a transmit part configured to provide said body coupled signal to said output; a controller configured to cause a clock signal used by one of the receive part and the transmit part with to be offset with respect to a clock signal used by the other of the receive part and the transmit part; and a switch arrangement provided between: said input and output; and said receive part and said transmit part, said switch arrangement configured to switch between the receive part and the transmit part during a clock cycle such that, in use, part of a clock cycle is available for signal transmission and part of the clock cycle is available for signal reception.

Any one or more of the above described features may be used in conjunction with this aspect.

According to another aspect, there is provided a method comprising: one of receiving a signal in the range of 100 kHz to 100 MHz and transmitting a signal in the range of 100 kHz to 100 MHz using a first clock signal; and switching to the other of receiving a signal in the range of 100 kHz to 100 MHz and transmitting a signal in the range of 100 kHz to 100 MHz (304) using an clock signal offset with respect to the first clock signal, wherein the switching is such that during a clock cycle, part of the clock cycle is used for transmitting said signal and part of the clock cycle is used for receiving said signal.

These and other aspects of the invention are apparent from and will be elucidated with reference to the embodiments described hereinafter.

It will be appreciated that two or more of the above-mentioned options, implementations, and/or aspects of the invention may be combined in any way deemed useful.

BRIEF DESCRIPTION OF THE DRAWINGS

Some embodiments will now be described by way of example only and with reference to the accompanying Figures in which.

DETAILED DESCRIPTION OF THE EMBODIMENTS

Some embodiments may provide a communication apparatus comprising: an input configured to receive signal in the range of 100 kHz to 100 MHz; a receive part configured to receive the signal from said input; an output configured to output a signal in the range of 100 kHz to 100 MHz; a transmit part configured to provide said signal to said output; a controller configured to cause a clock signal used by one of the receive part and the transmit part with to be offset with respect to a clock signal used by the other of the receive part and the transmit part; and a switch arrangement provided between: said input and output; and said receive part and said transmit part, wherein said switch arrangement is configured to switch between the receive part and the transmit part during a clock cycle such that, in use, part of the clock cycle is available for signal transmission and part of the clock cycle is available for signal reception.

Some embodiments may have the advantage a channel bandwidth can be fully utilized as compared to a half-duplex operation.

Some embodiments may avoid direct coupling of the transmitted signal to the receiving part during transmitting. This may provide good isolation.

Some embodiments may be relatively simple to implement with efficient use of hardware resources In some embodiments, in-band full-duplex (FD) wireless communication, i.e. simultaneous transmission and reception at the same frequency, in the same channel, may provide of the order of twice the spectral efficiency. Advantage may be achieved in higher network layers. Some embodiment address the issue of strong in-band leakage from the transmitter to the receiver (i.e. self-interference (SI)), as transmit powers are typically >100 dB stronger than the weakest signal to be received.

Some embodiments which may achieve a full duplex operation of a transceiver for body-coupled communication may be described.

The input may be configured to receive a body coupled signal and said output may be configured to output a body coupled signal, said input and output may be configured to be coupled to one or more common body coupled communication electrodes. In some embodiments the same electrodes may be used for reception and transmission. These electrodes are sometimes referred to as couplers.

It should be appreciated that although some embodiments are described as being for body coupled communication, it should be appreciated that other embodiments may be used for other types of communication, for example where the signal has a frequency within the above mentioned range.

The methods is based on time-interleaved switching of the transceiver between RX and TX mode for each TX or RX bit. In this way the same couplers can be used for transmission and reception without self-interference. For proper time alignment the full-duplex operation should start initial handshake in half-duplex mode.

Figure 1:
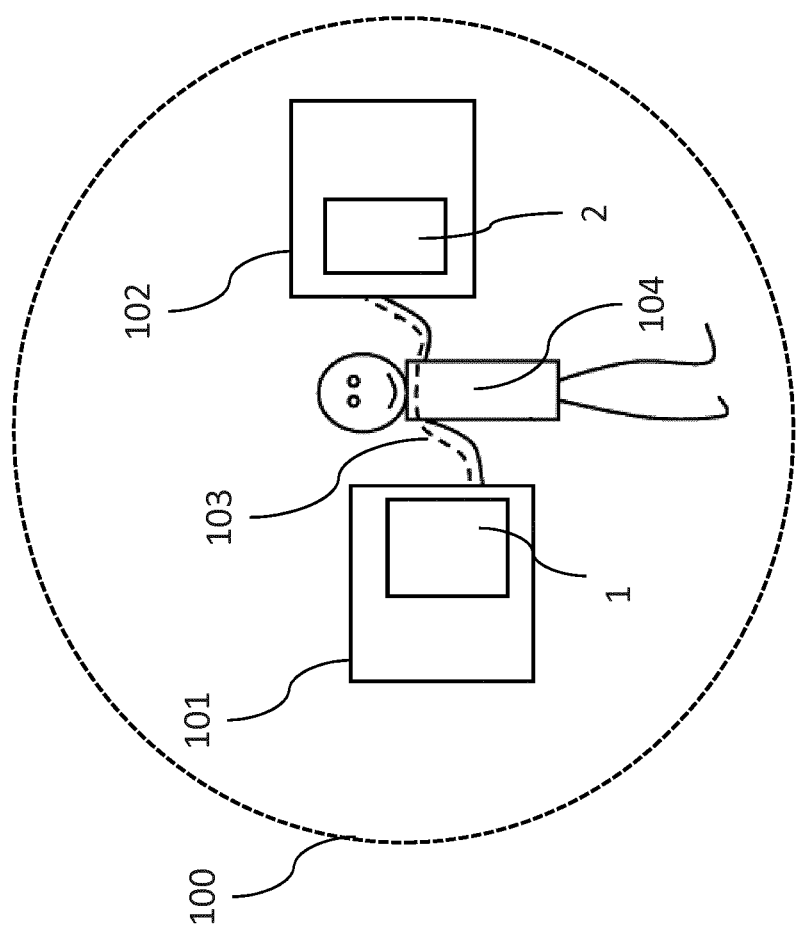
FIG. 1 schematically shows an embodiment of a body-coupled communication BCC system.

Reference is now made to FIG. 1 which shows a wireless body area network (WBAN) 100, comprising a first BCC device 101, and a second BCC device 102. In some embodiments more than two BCC devices are utilized. The first BCC device 101, is able to communicate with a second BCC device 102 via a communication channel 103 in the body of a person 104. For example, the first BCC device 101 contains a transmitter 1, and the second BCC device 102 contains a receiver 2. It should be appreciated that in practice the first BCC device 101 has both a transmitter and a receiver. The second BCC device 102 also has both a transmitter and a receiver.

Figure 2:
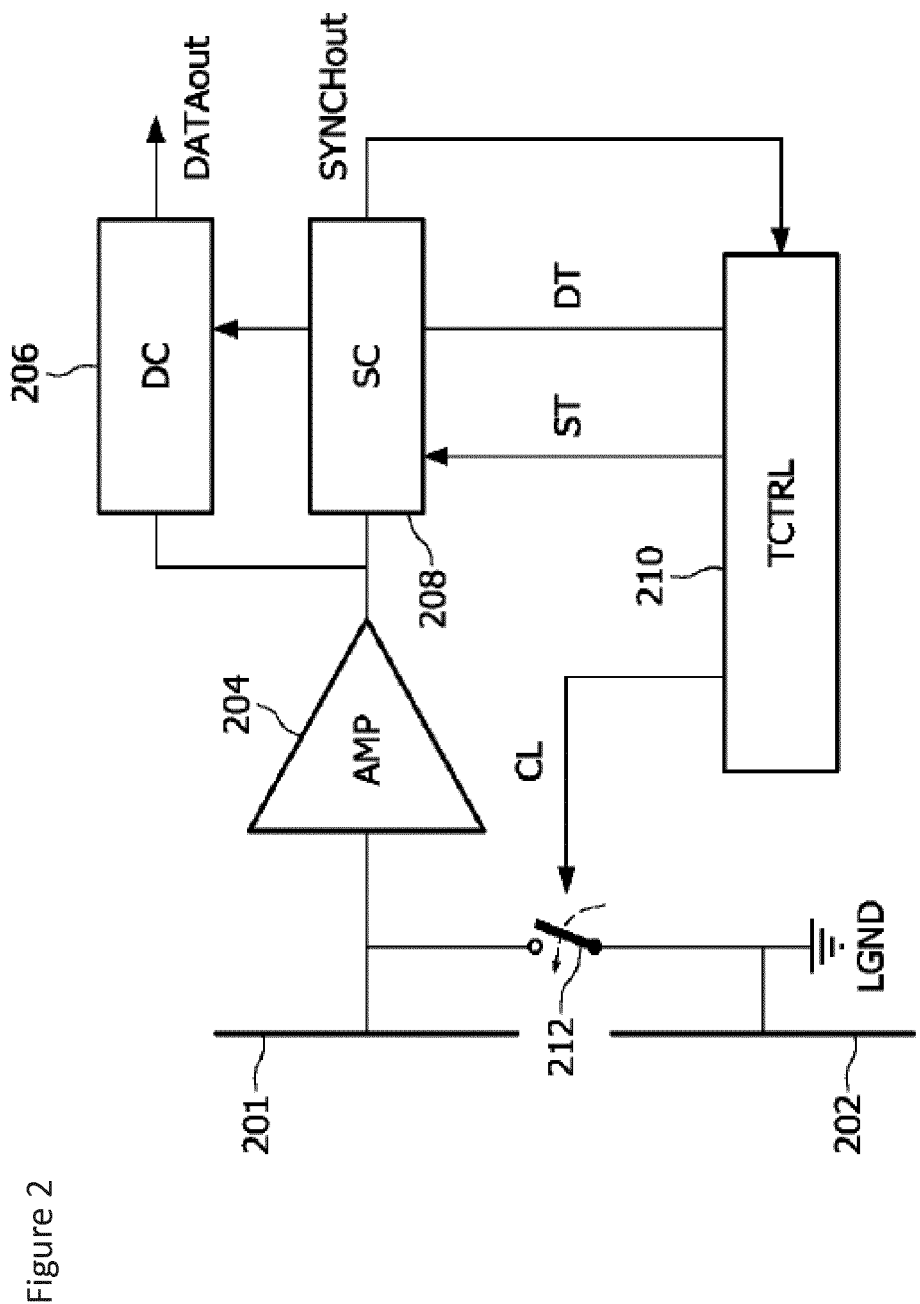
FIG. 2 shows a half-duplex wideband BCC architecture.

Reference is made to FIG. 2 which shows a schematic block diagram of a transceiver device. This is used in a half-duplex arrangement where the transmitting and receiving are time multiplexed.

In a half-duplex system the transmit (TX) and receive (RX) are periods of time that contain many clock cycles. For example, one device is only transmitting while the other is only receiving. When the devices have both TX and RX capability, there is minimal number of clock cycles needed to switch between transmitter and receiver mode.

The transceiver device comprises or can be connected to two BCC couplers 201, 202, wherein a ground coupler 202 can be connected to local ground (LGND). A switch or switch arrangement 212 is provided for switch-based filtering at the input of the receiver device. Switching can be achieved by shorting the BCC couplers 201, 202 in response to a clamp signal CL generated by a timing control circuit (TCTRL) 210. An amplifier 204 may be provided for amplifying the switched incoming signal. It is worth noting that in the arrangement of FIG. 2, the amplifier 204 is implemented to perform a single-ended amplification, because one of the couplers (i.e. ground coupler 202) is connected to the local ground which is considered as a reference potential. Of course, other configurations where both couplers 201 and 202 receive a BCC signal or are used as a differential input are also possible.

The received signal is then correlated in a data correlator (DC) 206 with a template signal or reference signal related to the expected incoming signal (e.g. high degree of likelihood in shape or other parameter) to achieve to a suppression of non-wanted components (such as interference or noise) in the received signal. The correlation can be performed at chip level or at symbol level following the selected code, e.g., depending on the level of filtering required to achieve the wanted bit-error-rate (BER). Here, a "chip" is referred to as an information or code portion coded in one single RX period. I.e., every bit may be coded in a symbol that can comprise one or more chips. The output DATAout of the data correlator 206 may for example be properly sliced by applying a one-bit analog-to-digital conversion (by using one comparator, not shown), where the result forms the wanted received bit stream.

Additionally, with the arrangement of FIG. 2, synchronization between the receiving and transmitting sides is provided in order to have a good correlation between the incoming signal and the locally generated template (i.e. reference signal). This can be achieved by computing another correlation in a synchronization correlator (SC) 208 which performs correlation between the incoming signal and a synchronization pattern. This correlation may be performed for every RX period and the outcome of this correlation operation may be information SYNCHout about the phase difference between the template (i.e. synchronization pattern) and incoming signal. The obtained (phase) information SYNCHout is then fed to the timing control circuit 210 which uses it to adjust its internal frequency in order to achieve the wanted synchronization between the receiving and transmitting sides.

Given the characteristic of the body channel and the bandwidth of interest, one option for BCC is the direct coupling to the human body of digital wideband signals, without any kind of modulation or up conversion. This is supported by the arrangement of FIG. 2. At the input of the receiving device, switch-based high-pass filtering is implemented by shorting the BCC plates. The filtered received signal is subsequently amplified and then correlated with a template signal that should be as closely identical as possible with the expected incoming signal to lead to a beneficial suppression of every component that is not wanted (such as interference or noise). As mentioned, a good synchronization is provided, this being enabled by another correlation block that performs the correlation between the incoming signal and the synchronization pattern. The use of switch-based filtering as well as correlation may be efficient since the output of the input stage is a series of square, positive or negative, pulses that can be easily correlated with single-bit digital signals.

A half-duplex system will limit the data rate. The option of increasing the frequency in order to increase the data rate may not be feasible if that results in the body becoming an antenna, resulting in signal loss.

Further, higher frequency of operation may be associated with higher energy consumption and may be more prone to timing errors. Broad band modulation schemes can potentially increase the achievable data rate however, those may suffer from wide band noise.

A full duplex system is generally considered to require isolation between the transmitter side and the receiver side. Generally such systems require two oscillator clock systems because different channels/frequencies are required. This makes the hardware potentially complex. Isolators may be required at the antenna/coupler. Some embodiments may address one or more of the issues.

Some embodiments may use a transmitter which makes use of a transmitter/receiver switch which switches at the rate of the transmitter clock. An offset of the clock is used to ensure that the receiver data edges and transmitter data edges are in the same time window. The window may be a clock cycle. This may remove the requirement to have two oscillators and the need for isolators.

Some embodiments may use an encoding scheme where a transition from high to low or vice versa is used to indicate "1" and "0". The encoding scheme may be Manchester encoding or any other suitable encoding scheme.

The communication apparatus may comprise a local oscillator configured to provide clock signals used by said transmit part and said receive part.

A single oscillator may be used as compared to the half-duplex arrangements which may use two.

The controller may be configured to provide at least one control signal to control said switch arrangement, the at least one control signal having a speed of said clock signal.

This may assist in providing a quick transition between receiving and transmitting of signals.

Figure 3:
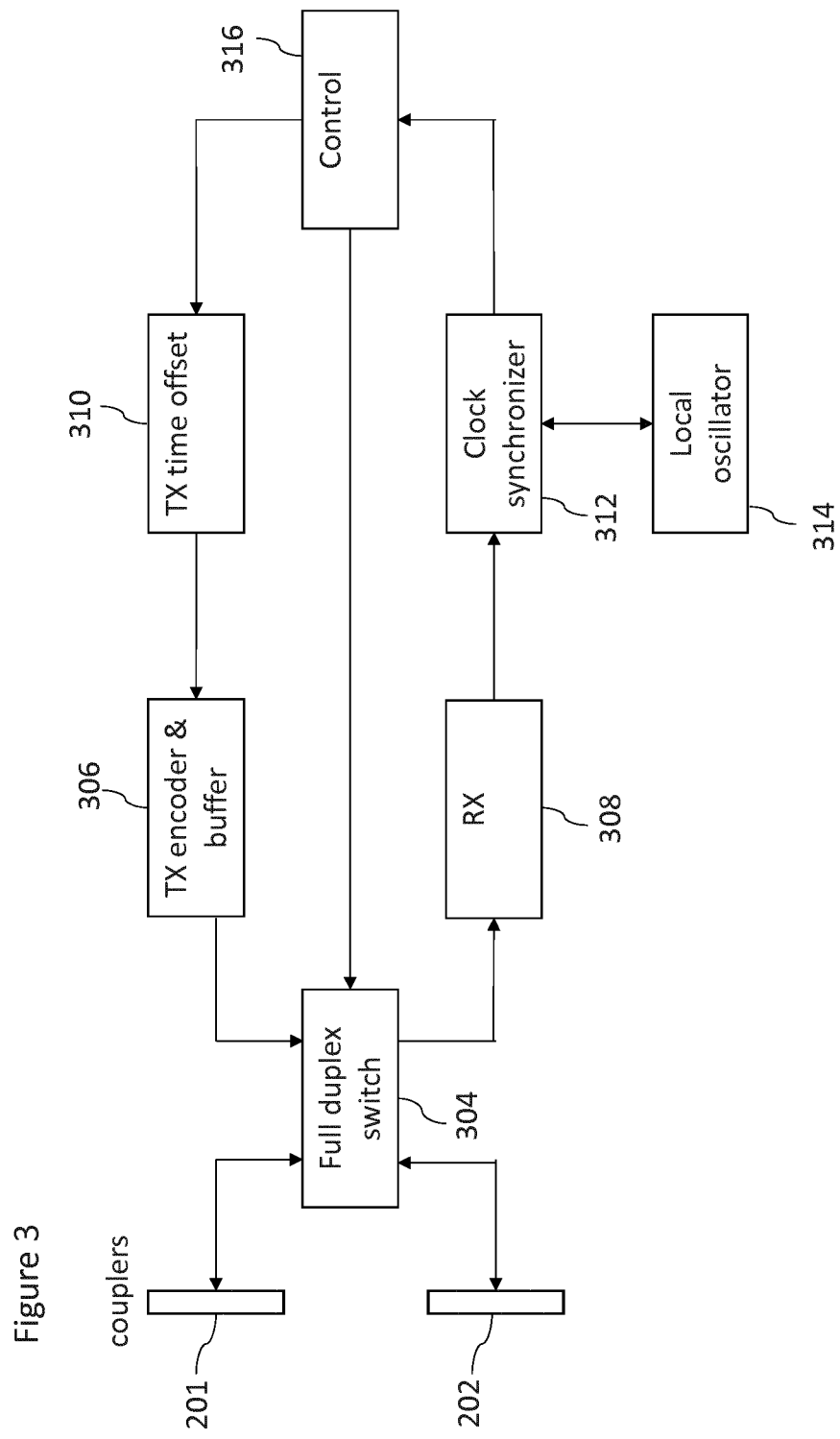
FIG. 3 shows a BCC transceiver architecture of an embodiment.

Reference is made to FIG. 3 which shows a BCC transceiver architecture which is able to support a full duplex operation, in one embodiment. The arrangement of FIG. 3 comprises a first coupler 201 and a second coupler 202. The first and second couplers are arranged to provide a received signal to the full duplex switch 304. The first and second couplers are also arranged to receive a signal to be transmitted from the full duplex switch 304.

The full duplex switch 304 is configured to provide the signal received from the couplers 201 and 202 to a receiver 308. The output of the receiver 308 is provided as an input to a clock synchronizer 312. The clock synchronizer 312 is configured to provide an output to a local oscillator 314 and to receive an input from the local oscillator 314. An output of the clock synchronizer is configured to provide an input to a control function 316. The control function 316 is configured to provide a first control output to the full duplex switch 304 and a second control output to a transmitter time offset controller 310. The output of the transmitter time offset controller 310 is provided as an input to a transmitter encoder and buffer 306. The transmitter encoder and buffer 306 is configured to output the signal to be transmitted to the full duplex switch 304 using the timing defined by the transmitter time offset controller.

The synchronized clock is used for one or more of the following: retrieving the receive data; as input of the control block which controls/switches the full duplex switch with a frequency that is at least twice the frequency of the synchronized clock; and; after a controlled offset to clock the transmitter data.

The time offset controller may be simple, for example via an inverter type of circuit an opposite clock edge is used for synchronization. In cases requiring higher accuracy, the time offset controller may be implemented with a digital phase locked loop that will guarantee high accuracy (in time) offset of the two signals.

Embodiments use one oscillator to control the transmitter and receiver timings. The transmitter and receiver timings are the same however, a fixed time offset is introduced between them. The fixed time offset is controlled by the transmitter time offset controller 310 such that after synchronization with the edges of the input in the receiver chain, the transmitted signal is shifted in time to appear with a time offset in respect to the locked in signals. It should be appreciated that the transmitter timing may be offset with respect to the receiver timing or vice versa.

In some embodiments, one of the signals may be considered to be a responding signal and one of the signals an interrogating signal. Generally the responding signal is offset with respect to the interrogating signal. The interrogating signal will be one of the received and transmitted signals and the responding signal will be the other of the transmitted and received signals.

The signal to be transmitted and said received signal may be encoded with a transition based scheme.

This may make the signal less susceptible to background noise.

The transmitted signals and/or received be maybe Manchester encoded coding or any other type of transition-based coding can be applied to this bit stream in order to achieve for example at least one voltage transition for each chip period.

In some embodiment, the signal may be a DC free (e.g. Manchester) encoded signal.

The frequency range may be 19 MHz or less in some embodiments.

The switch is switched between the transmission TX mode and receiver RX mode during each clock cycle thus operating at a much higher speed as compared to a half-duplex arrangement. The speed may be at least twice as high.

The switch is implemented in such a way as to prevent coupling of signal between the transmitter and receiver parts during the switching. As the switch completely disconnects either the receiver or the transmitter lines, the coupling may be parasitic e.g. through parasitic capacitances in the switch.

Figure 4:
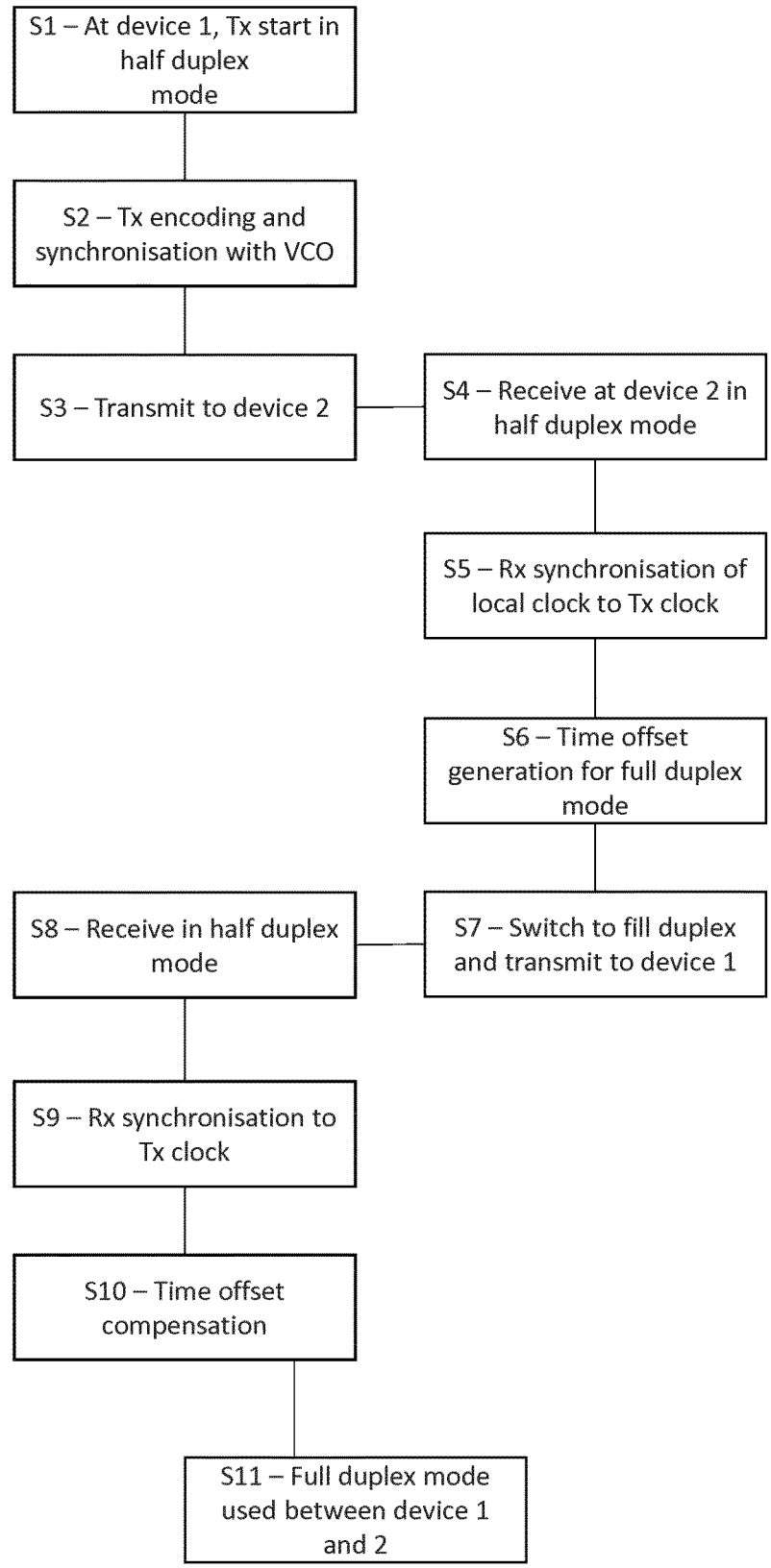
FIG. 4 shows a method flow using the architecture of FIG. 3.
Figure 6:
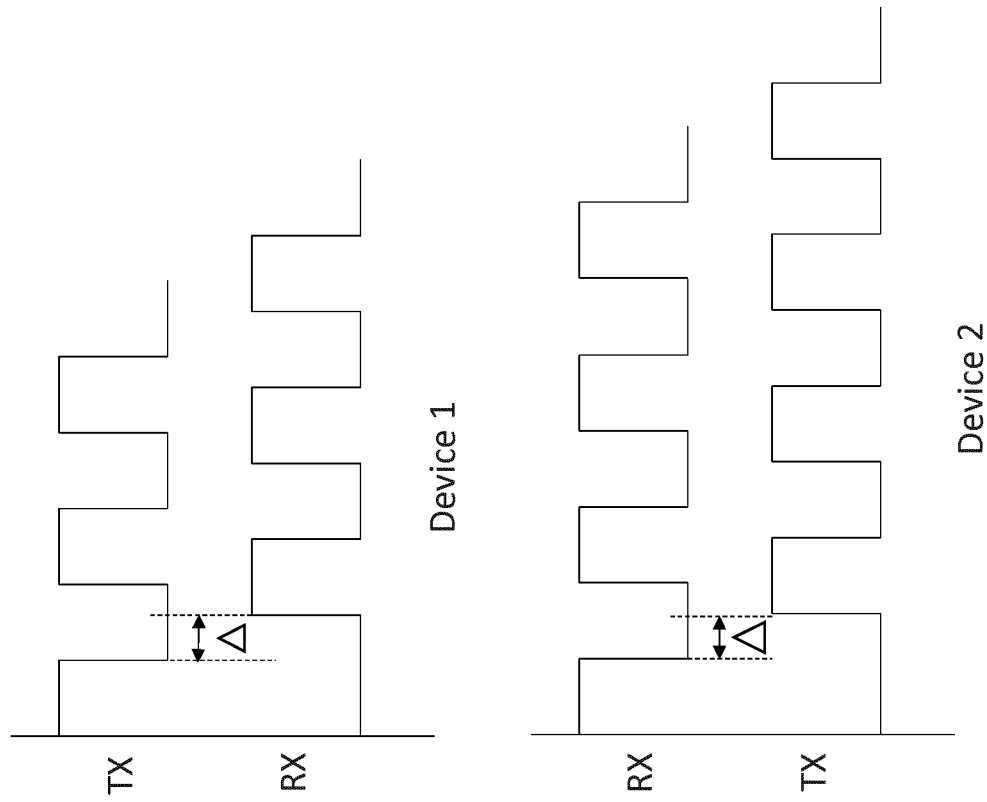
FIG. 6 shows the timing of some of the signals of the architecture of FIG. 3.

Reference is made to FIGS. 4 and 6 which show a method flow and some timing diagrams respectively. In this example, device 1 is communicating with device 2. Each the devices have the structure as shown in FIG. 3. The communication is initiated by the first device, device 1.

In step S1, the communication starts in half-duplex mode. At device 1, the transmission starts in the half-duplex mode. In other words, device 1 will only be transmitting or receiving in a given clock cycle.

In step S2, there is transmission encoding and synchronisation with the local oscillator (which may be a voltage controlled oscillator VCO) at device 1 of the signal to be transmitted. It should be appreciated that this step may be optional. The device initiating the communication may also provide the time reference to each of the VCOs in all devices. Those are locking with or without time offset. This optional step may be used to help with time alignments.

In step S3, there is a transmission of the signal to be transmitted from device 1 to device 2.

In step S4, the transmitted signal is received at the second device which is also operating in a half-duplex mode.

In step S5, there is receive synchronisation of the clock in the second device with respect to the transmission clock of the first device.

In step S6, a time offset is generated for the full duplex mode of operation. In other words a transmitter time offset is generated so that the transmitted signal (represented by a transition between 0 and 1) from the second device will be offset in time from the received signal (represented by a transition between 0 and 1) from the first device.

In step S7, the second device will now switch to the full duplex mode and will transmit to device 1 at a time controlled by the offset.

In step S8 the first device will receive the signal from the second device. The first device is still in the half duplex mode.

In step S9, there is receive synchronisation of the clock in the first device with respect to the transmission clock of the second device.

In step S10, a time offset is generated for the full duplex mode of operation of the first device, as described in relation to step S6.

In step S11, the first and second devices will be both operating in a full duplex mode when transmitting to and receiving from one other. Reference is made to FIG. 6 which shows for the first device, device 1, the transmit timing TX and the receive timing RX. As can be seen the clock edge for the receive timing is delayed by $\Delta$ as compared to a clock edge for the receive timing. Likewise FIG. 6 shows for the second device, device 2, the transmit timing TX and the receive timing RX. As can be seen the clock edge for the transmit timing is delayed by $\Delta$ as compared to a clock edge for the transmit timing. $\Delta$ represents the transmit time offset. The timing diagrams show that after synchronization the timing of the TX of each device is aligned with the timing of the RX of the other device.

$\Delta$ may be the same or different in the two devices. $\Delta$ will advance or move back the one or other of receive or transmit signals. This is so the transitions in the receive and transmit signals do not coincide. $\Delta$ has a value which is between 0 and T/2 where T is the length in time of the clock cycle. In some embodiments, the offset may be provided at the transmitter side. This may allow the receivers to stay locked all the time. Of course in other embodiments, the offset may be provided at the receiver side.

The controller may be configured to control said apparatus, such that in use, said apparatus has a first initial mode and a second mode, wherein in said first initial mode said apparatus operates in a half-duplex mode and in said second mode, said apparatus operates in a full duplex mode.

The half-duplex may be used to synchronise between devices before a full duplex mode is used.

The controller may be configured in said first mode of operation to determine a time offset for said clock signal.

This may ensure that an appropriate offset between the receive and transmit signals is easily determined.

In some embodiments time synchronization between TX and RX is achieved during a half-duplex mode. Then after this, the transceiver can enter a full-duplex mode and time interleave the RX and transmitter interval with a duration of half a clock period. The transmitter signal is thus properly locked with a time offset with respect to the receiver signal.

The transmit part may be configured such that signals to be transmitted to different devices are transmitted in different time slots. This allows the communication device to be in communication with a plurality of different devices.

The controller may be configured such that the clock signal used by one of the receive part and the transmit part has a plurality of different offsets with respect to the clock signal used by the other of the receive part and the transmit part such that in use a respective plurality of signals is one of transmitted and received in a clock cycle. This may allow the same apparatus to communicate with a plurality of different devices without delay. Thus some embodiments may have more than two nodes in a system. In this example, the peer to peer communications can be full duplex and the network may be time interleaved to allow for multiple devices.

In some embodiments, if the switch is controlled with a higher clock frequency and the transmitter delays can also be controlled with a relatively high accuracy, one TX can synchronize full duplex with one receiver 1 and still transmit to another receiver2 with a different time offset. This additional signal can be very useful to enable quick switch between devices.

In some embodiments, each additional device will increase the clock by a factor of 1 so if there are N additional devices, the clock frequency is N time larger as compared to the case where a device communicates with one other device.

In some embodiments, the devices start in full duplex mode. For example, both devices may a relatively high precision timing reference. That timing reference may be for example a crystal oscillator. If the device have the same or a known value for the reference, the offsets may be precalculated.

The switch may comprises at least one transistor.

In some embodiments, this may allow the apparatus may be at least partly implemented by integrated circuitry. Alternatively or additionally rapid switching may be achieved.

The switch may comprise a plurality of transistor arrangements, at least one transistor arrangement being provided between said input and said receive part, and at least one transistor arrangement being provided between said transmit part and said output.

At least one transistor arrangement provided between said input and said receive part may comprise a transistor of a first conductivity type and at least one transistor arrangement provided between the transmit part and said output may comprise a transistor of a second, different conductivity type.

This may reduce or avoid any signal coupling between the transmitter part and the receiver part.

At least one transistor arrangement may comprise a complementary MOS pair of transistors.

Figure 7:
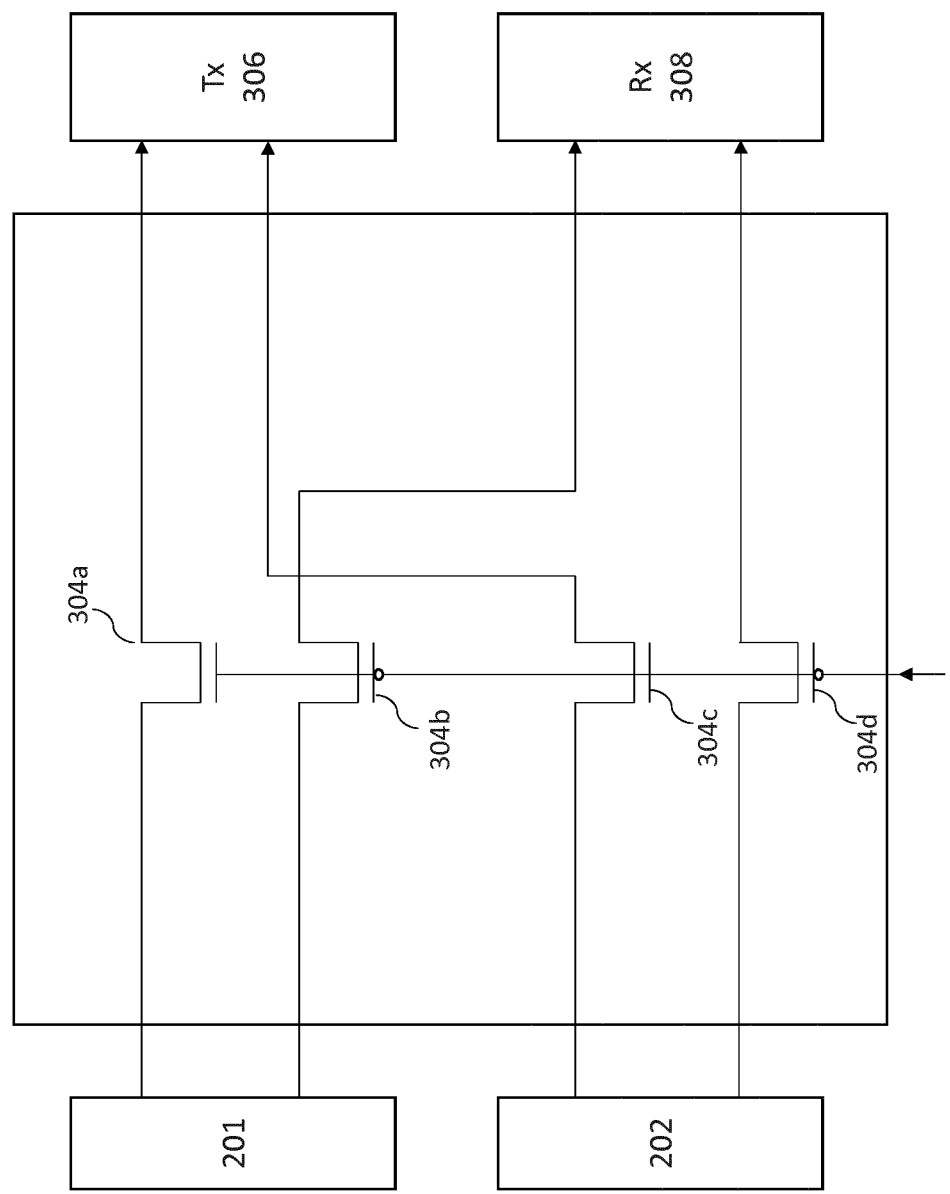
FIG. 7 shows a switch arrangement of some embodiments.

This may minimise effects such as charge injection and asymmetric duty cycle. In some embodiments, the switch can be realized with set of transistors. Reference is made to FIG. 7 which shows one implementation of the switch. For example, four transistors 304a, 304b, 304c, and 304d are provided. Each transistor acts as a switch. Transistor 304a is provided between the first coupler 201 and the transmitter part 306. Transistor 304b is provided between the first coupler 201 and the receiver part 308. Transistor 304c is provided between the second coupler 202 and the transmitter part 306. Transistor 304d is provided between the second coupler 202 and the receiver part 308. The first and third transistors are of one of P and N type and the second and fourth transistors are of the other of the P and N type. A control signal for the controller 316 will control the first and third transistors to be one of on and off and the second and fourth transistors to be the other of on and off. Thus two transistors are getting closed to connect the couplers to e.g. the receiver part while the other two are getting opened to disconnect for example the transmitter part from the couplers (or vice versa).

It should be appreciated that with a CMOS process this type of switching may be unlikely to introduce any signal coupling between the transmitter part and the receiver part.

In some embodiments, each transistor may be implemented as complementary MOS pair in order to minimise effects such as charge injection and asymmetric duty cycle.

In some embodiments, separate local grounds may be provide for the transmitter and receiver parts. This may avoid signal coupling through the ground lines.

In addition, the switching can be realized such that for example receiver is fully differential, while transmitter is connecting one of the plates to ground. In a fully differential case both RX and TX have two signal terminals that process differential signals with respect to an internal ground. In a single-ended alternative one of these terminal is grounded and used as a reference for the second terminal. In case of TX this means that TX buffer does not need to be differential at all. In the RX case one terminal of differential amplifier is just grounded.

Figure 5:
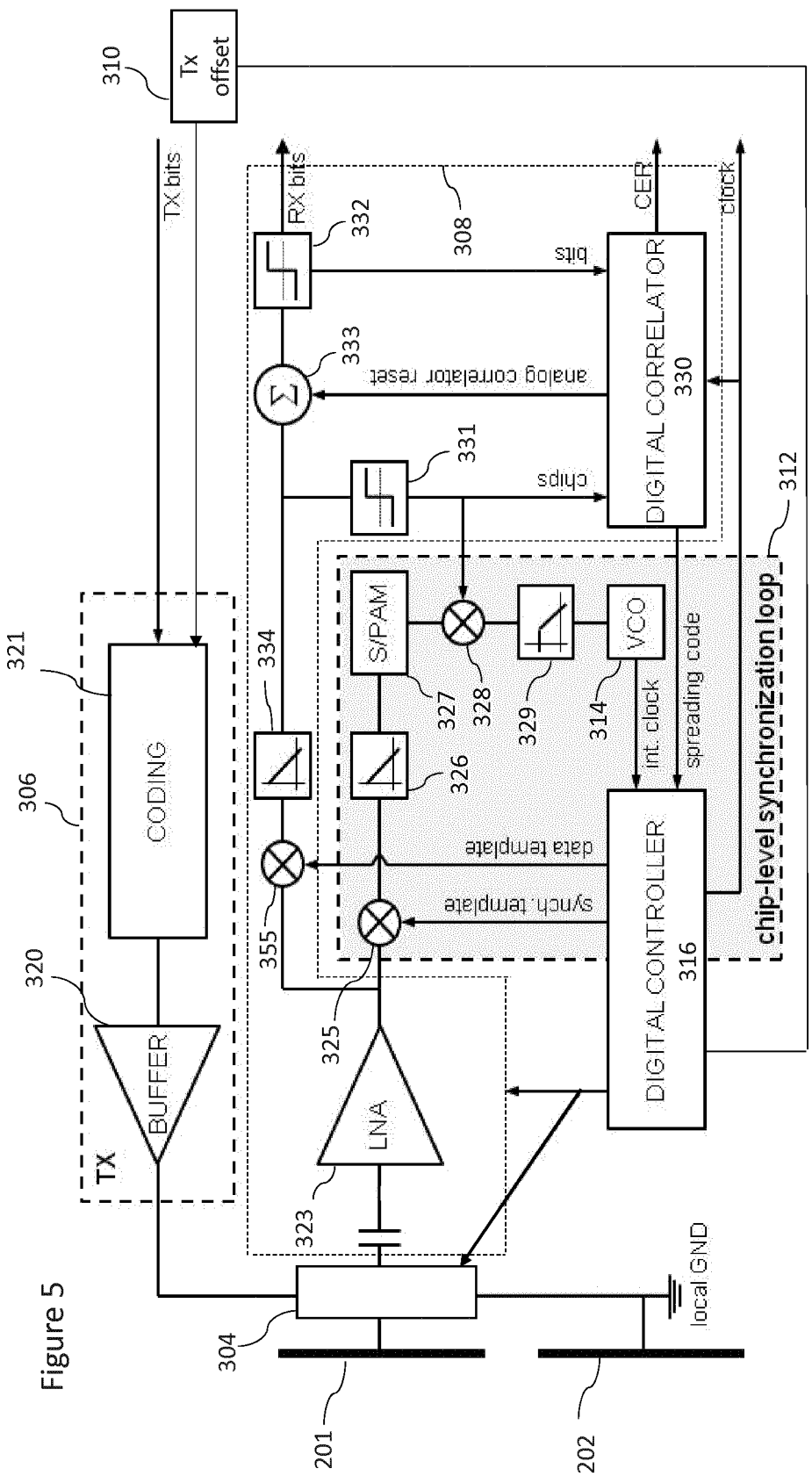
FIG. 5 shows one more detailed implementation of the BCC architecture of FIG. 3.

Reference is made to FIG. 5 which shows a more detailed schematic block diagram of a BCC transceiver. This shows in more detail one implementation of the arrangement shown in FIG. 3.

The transmitter encoder and buffer 306 of the BCC transceiver comprises a coder or coding circuit (C) 321 which codes an bit stream to be transmitted in another digital bit stream according to a selected spreading code and according to the requirement of having at least one signal transmission for each chip. Then this bit stream is coupled to the body via a digital buffer (DB) 320 (if needed, the digital buffer 320 may provide also a bandwidth limitation). Furthermore, a full duplex switch 304 is provided to be able to connect the digital buffer 320 to the body couplers or electrodes 201, 202.

The body couplers or electrodes 201, 202 are arranged as differential couplers in this embodiment, when a receiver mode is selected.

An input amplifier (e.g. low noise amplifier (LNA)) 323 may be provided at the input to the receive path, downstream of the switch 304. This amplifier may be controlled by the digital controller 316.

Other configurations are also possible and two or more of the above receiver input blocks could be cascaded in order to implement a multi-stage amplifier.

The amplified signal is then fed to two correlator circuits used for data detection and synchronization. In the present example, both correlators are implemented by analog multiplication of digital templates (e.g. a 1-bit-template ST as synchronization pattern for the synchronization and a 1-bit-template DT as reference signal for the data detection) with the incoming signal in respective data or synchronization multipliers 355, 325. When the synchronization template is "1" the amplified signal is multiplied by "1" (i.e. by a positive, constant, multiplication factor) at the synchronization multiplier 325. When the synchronization template is "0", the amplified signal is multiplied by "−1" (i.e. by a negative, constant, multiplication factor) at the synchronization multiplier 325. The results of the multiplications are then integrated in respective data or synchronization integrators 334, 326 over the receiver period (e.g. chip period) to actually compute the respective data or synchronization correlation. The integration outputs correspond to the desired data and synchronization information.

In order to close the chip level synchronization loop SL, the correlation between the synchronization template and the incoming signal is sampled at the end of the integration period by a sampling and pulse amplitude modulation (PAM) circuit (S/PAM) 327. The sampled PAM value can now be multiplied in a further multiplier 328 by "+1" or "−1" according to the polarity of the detected data (CPS) in order to guarantee the right polarity according to the incoming data. During the mentioned synchronization sequence the polarity selection can be performed by using a fixed synchronization pattern compliant with the synchronization sequence generated by the transmitter subsystem. The further multiplier 328 thus acts as a polarity control element which controls the polarity of the output value of the second correlator in accordance with the polarity of the detected data (i.e. decoded signal). The signal from the multiplier 328 is then filtered in a loop-filter (LF) 234 and fed to the voltage-controlled oscillator (VCO) 314 that generates based on its input an internal clock ICLK used as a time base or time reference for the generation of the control and template signals (e.g. clamp signal CL, synchronization template ST, reference template DT, clock signal CLK) at the digital controller 316. The filtering of the synchronization information is thus performed by generating a pulse (PAM signal) proportional to the sampled signal that is then filtered at the loop filter 329.

Concerning the data detection branch, the correlation at the data correlator can be performed at chip-level and can be first converted to a digital bit stream CPS by using a comparator 331 and fed to a digital correlator (DIC) 330 that performs a symbol level synchronization and provides a correct and synchronized code sequence SCD for template generation at the digital controller 316. Moreover, if analogue correlation at symbol level is also required for reliability reasons, the analogue output of the chip level correlator can be further integrated over the symbol length in an analog accumulator 333 and the digital correlator 330 can control the accumulation time over the symbols by generating an analogue correlator reset signal CRST and supplying it to the analog accumulator 333. The symbol-level correlation is then converted to digital by using a comparator 332 to provide the desired bit stream BS of the received bits. If reliability is not a problem the analog accumulator can be omitted and the digital correlator can be used for symbol level correlation.

As an additional option, a comparison between the output bit stream BS, coming from the analogue symbol-level correlator and an expected bit stream generated by the digital correlator, could be used as a measure of the quality of the incoming signal, which could be referred to and output as Chip-Error-Rate signal CER.

The transmit and receive signals may be in the frequency range of 100 kHz to 100 MHz.

The transmit and receive signals may have the same or different frequencies.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. A communication apparatus comprising:
an input configured to receive a signal in a range of 100 kHz to 100 MHz;
a receiver configured to receive the signal from the input;
an output configured to output the signal in the range of 100 kHz to 100 MHz;
a transmitter configured to provide the signal to the output;
a controller circuit configured to cause a clock signal used by one of the receiver and the transmitter to be offset with respect to a clock signal used by the other of the receiver and the transmitter; and
a switch provided between the input and the output, and the receiver and the transmitter;
wherein the switch is configured to switch between the receiver and the transmitter during a clock cycle such that a part of the clock cycle is available for signal transmission and another part of the clock cycle is available for signal reception.

2. The communication apparatus as claimed in claim 1, wherein the input is configured to receive a body coupled signal and the output is configured to output the body coupled signal,
wherein the input and the output are configured to be coupled to one or more common body coupled communication electrodes.

3. The communication apparatus as claimed in claim 1, wherein the switch comprises at least one transistor.

4. The communication apparatus as claimed in claim 3, wherein said switch comprises a plurality of transistors, wherein at least one first transistor arrangement is provided between said input and said receiver and at least one second transistor arrangement is provided between the transmitter and the output.

5. The communication apparatus as claimed in claim 1,
wherein at least one first transistor group is provided between said input and said receiver,
wherein the at least one first transistor group comprises a transistor of a first conductivity type,
wherein at least one second transistor group is provided between the transmitter and said output,
wherein the at least one second transistor group comprises a transistor of a second conductivity type.

6. The communication apparatus as claimed in claim 5, wherein at least one of the first transistor group and the second transistor group comprises a complementary MOS pair of transistors.

7. The communication apparatus as claimed in claim 1, wherein the transmitter is configured such that signals to be transmitted to different devices are transmitted in different time slots.

8. The communication apparatus as claimed in claim 1, wherein said controller circuit is configured such that the clock signal used by the receiver has a plurality of different offsets with respect to the clock signal used by the transmitter such that a respective plurality of signals are transmitted and received in a clock cycle.

9. The communication apparatus as claimed in claim 1, wherein said controller circuit is configured to control said apparatus such that said apparatus has a first initial mode and a second mode, wherein in said first initial mode said apparatus operates in a half-duplex mode and in said second mode said apparatus operates in a full duplex mode.

10. The communication apparatus as claimed in claim 9, wherein said controller circuit is configured in said first initial mode to determine a time offset for said clock signal.

11. The communication apparatus as claimed in claim 1, comprising a local oscillator configured to provide clock signals used by said transmitter and said receiver.

12. The communication apparatus as claimed in claim 1, wherein said signal is encoded with a transition based scheme.

13. The communication apparatus as claimed in claim 1, wherein said controller circuit is configured to provide at least one control signal to control said switch, said at least one control signal having a speed of said clock signal.

14. The communication apparatus as claimed in claim 1, wherein the communication apparatus is a body coupled communication device.

15. The communication apparatus as claimed in claim 1, wherein the controller circuit is configured such that the clock signal used by the transmitter has a plurality of different offsets with respect to the clock signal used by the receiver such that a respective plurality of signals are transmitted and received in a clock cycle.

16. A signal processing method comprising:
   using a first clock signal for one of a receiving a signal in a range of 100 kHz to 100 MHz or a transmitting a signal in the range of 100 kHz to 100 MHz;
   controlling the first clock signal used in one of the receiving or the transmitting to be offset with respect to a second clock signal used by the other one of the receiving or the transmitting; and
   switching between the receiving and the transmitting during a clock cycle such that one part of the clock cycle is used for the transmitting and another part of the clock cycle is used for the receiving.

17. The method as claimed in claim 16, wherein the switching is realized by a plurality of transistors.

* * * * *